United States Patent
Hori et al.

(10) Patent No.: US 12,158,784 B2
(45) Date of Patent: Dec. 3, 2024

(54) DRIVE BOX

(71) Applicant: Hitachi, Ltd., Tokyo (JP)

(72) Inventors: Masanori Hori, Tokyo (JP); Ryoma Muto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 18/116,394

(22) Filed: Mar. 2, 2023

(65) Prior Publication Data
US 2024/0143049 A1    May 2, 2024

(30) Foreign Application Priority Data
Oct. 28, 2022    (JP) .................................. 2022-173035

(51) Int. Cl.
G06F 1/18    (2006.01)
G06F 1/26    (2006.01)

(52) U.S. Cl.
CPC .............. G06F 1/189 (2013.01); G06F 1/266 (2013.01)

(58) Field of Classification Search
None
See application file for complete search history.

(56) References Cited

U.S. PATENT DOCUMENTS

| | | | |
|---|---|---|---|
| 2013/0047030 A1* | 2/2013 | Soeda | H02J 9/061 713/300 |
| 2014/0008370 A1* | 1/2014 | Judd | H05K 7/14 220/500 |
| 2018/0203779 A1 | 7/2018 | Huang et al. | |
| 2020/0133805 A1* | 4/2020 | Bisa | G06F 11/349 |
| 2023/0168980 A1* | 6/2023 | Nakashima | G06F 13/4221 714/6.2 |

FOREIGN PATENT DOCUMENTS

JP    2018116679 A    7/2018

* cited by examiner

*Primary Examiner* — Fahmida Rahman
(74) *Attorney, Agent, or Firm* — Procopio, Cory, Hargreaves & Savitch LLP

(57) ABSTRACT

A drive box includes a power source, a drive group which is constituted of a plurality of storages, a canister which can be replaced, and a midplane which couples the canister and the drive group, wherein the midplane includes a storage apparatus having a memory unit in which data related to at least the drive group is stored, the canister has a communication channel which is coupled to at least one of the plurality of storages, the canister performs I2C communication with the storage apparatus, power is supplied to the canister from the power source by a first supply line which is a power line passing through the midplane, and power is supplied to the storage apparatus from the power source via the canister.

5 Claims, 9 Drawing Sheets

DRIVE BOX

BACKGROUND OF THE INVENTION

1. Field of the Invention

The present invention relates to a drive box constituting a storage system.

2. Description of the Related Art

A storage system of which continuous operation is required is configured such that, even in the case where a hardware failure occurs, continuous operation is allowed by redundancy of each part. In addition, the storage system is structured so as to allow replacement of a failed part while maintaining an operating state, whereby it is possible to replace the failed part without causing the system to go down. However, for some components, there are cases where it is difficult to adopt redundancy due to structures thereof, and there are cases where it is not possible to perform replacement during operation. In these cases, an attempt to reduce a failure rate is made by reducing the number of mounted parts as much as possible. Japanese Patent Application Publication No. 2018-116679 discloses a method of monitoring an I2C bus status which uses a board management controller and a hardware watchdog circuit, the monitoring method including a detection step of detecting expiration of an I2C bus by using the HW circuit, a determination step of causing the HW circuit to determine whether or not a plurality of I2C devices on the I2C bus can be automatically reset, a step of resetting the plurality of I2C devices by using the HW circuit in the case where the HW circuit determines that the I2C devices on the I2C bus can be automatically reset, and a processing step of reporting detected expiration to the BMC by using the HW circuit and processing the detected expiration by using the BMC in the case where the HW circuit determines that the I2C devices on the I2C bus cannot be automatically reset.

SUMMARY OF THE INVENTION

In the invention described in Japanese Patent Application Publication No. 2018-116679, it is not possible to perform a hard reset on the I2C device which does not have a reset switch.

According to the 1st aspect of the present invention, a drive box includes a power source, a drive group which is constituted of a plurality of storages, a canister which can be replaced, and a midplane which couples the canister and the drive group, wherein the midplane includes a storage apparatus having a memory unit in which data related to at least the drive group is stored, the canister has a communication channel which is coupled to at least one of the plurality of storages, the canister performs I2C communication with the storage apparatus, power is supplied to the canister from the power source by a first supply line which is a power line passing through the midplane, and power is supplied to the storage apparatus from the power source via the canister.

According to the present invention, it is possible to perform the hard reset on the I2C device which cannot be powered off or replaced during operation and does not have the reset switch.

DESCRIPTION OF THE PREFERRED EMBODIMENTS

First Embodiment

Hereinbelow, a first embodiment of a drive box according to the present invention will be described with reference to FIGS. 1 to 7.

Figure 1:
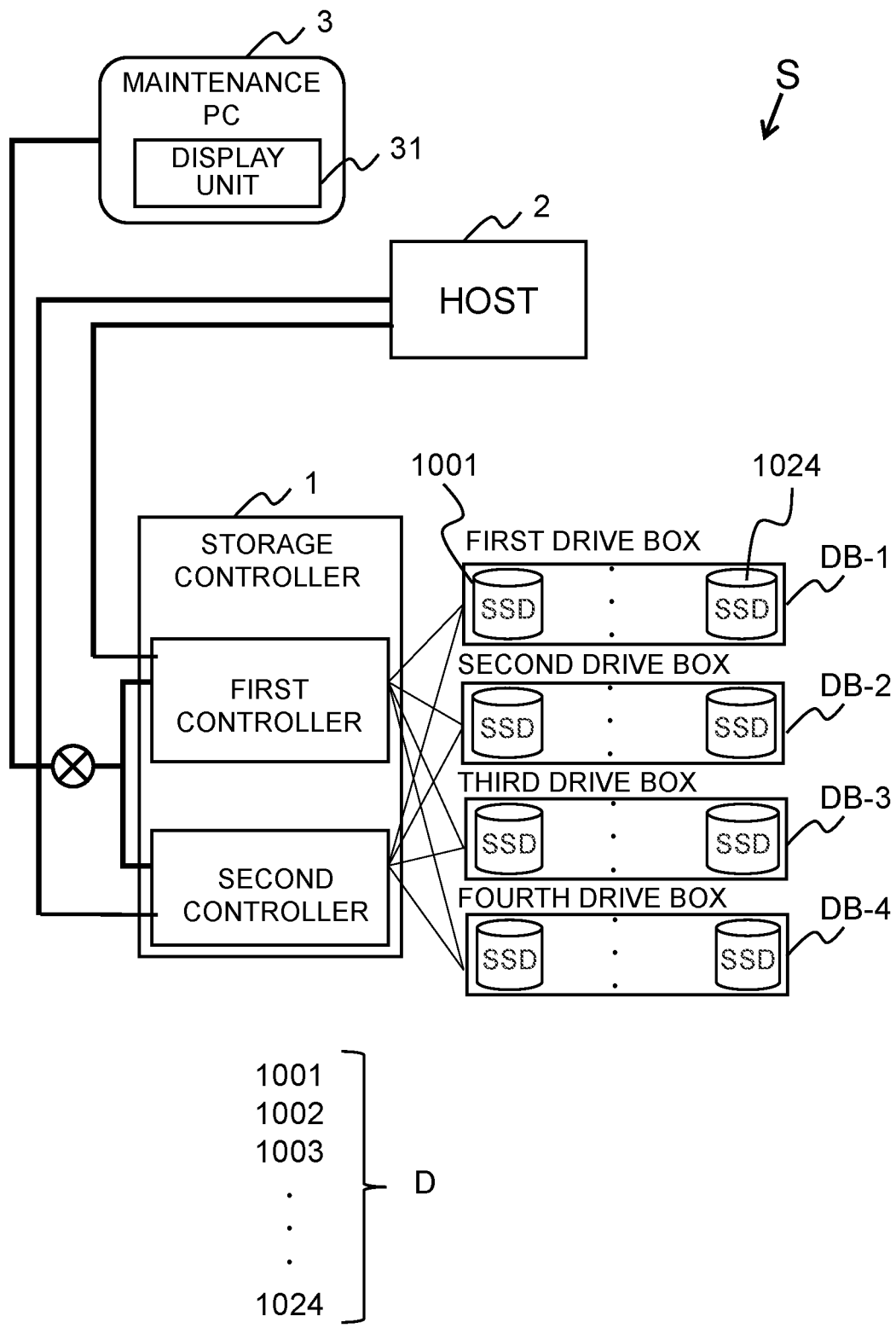
FIG. 1 is a view showing a storage system.

FIG. 1 is a view showing a storage system S including drive boxes. The storage system S includes a storage controller 1, a host 2, and a maintenance PC 3. The storage controller 1 is coupled to the host 2 and the maintenance PC 3. The storage controller 1 controls a large number of drives, and provides storage resources to the host 2.

The storage controller 1 includes a first controller and a second controller. The functions of the first controller and the second controller are identical to each other and it can be said that the storage controller 1 has a redundancy configuration. Each of the first controller and the second controller is coupled to all of a first drive box DB-1, a second drive box DB-2, a third drive box DB-3, and a fourth drive box DB-4. Each of the drive boxes communicates with the host 2 and the maintenance PC 3 via the storage controller 1. The configurations of the first drive box DB-1, the second drive box DB-2, the third drive box DB-3, and the fourth drive box DB-4 are identical to each other, and hence the configuration of the first drive box DB-1 will be described in the following description.

A plurality of drives, e.g., hard disk drives and SSDs (Solid State Drive) are incorporated in the first drive box DB-1. In the present embodiment, twenty-four SSDs, i.e., a first SSD 1001 to a twenty-fourth SSD 1024 are incorporated in the first drive box DB-1. Note that, in the following description, the first SSD 1001 to the twenty-fourth SSD 1024 are also collectively referred to as a drive group D.

The maintenance PC 3 is a general-purpose computer. The maintenance PC 3 includes a display unit 31 which presents information to an operator with an image. When a problem occurs, the first drive box DB-1 outputs information on the problem which has occurred to the display unit 31 of the maintenance PC 3. The display unit 31 is, e.g., a liquid crystal display.

Figure 2:
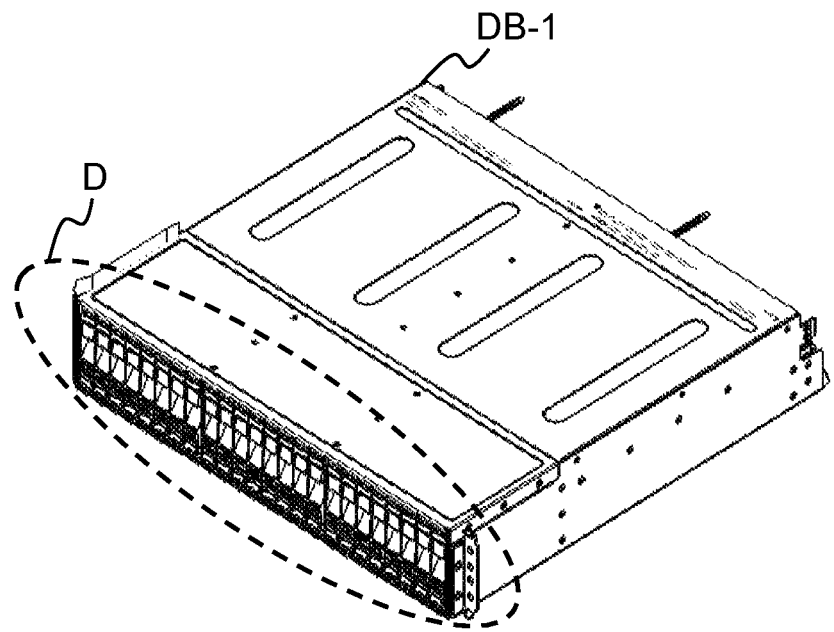
FIG. 2 is an external view of a first drive box.
Figure 2:
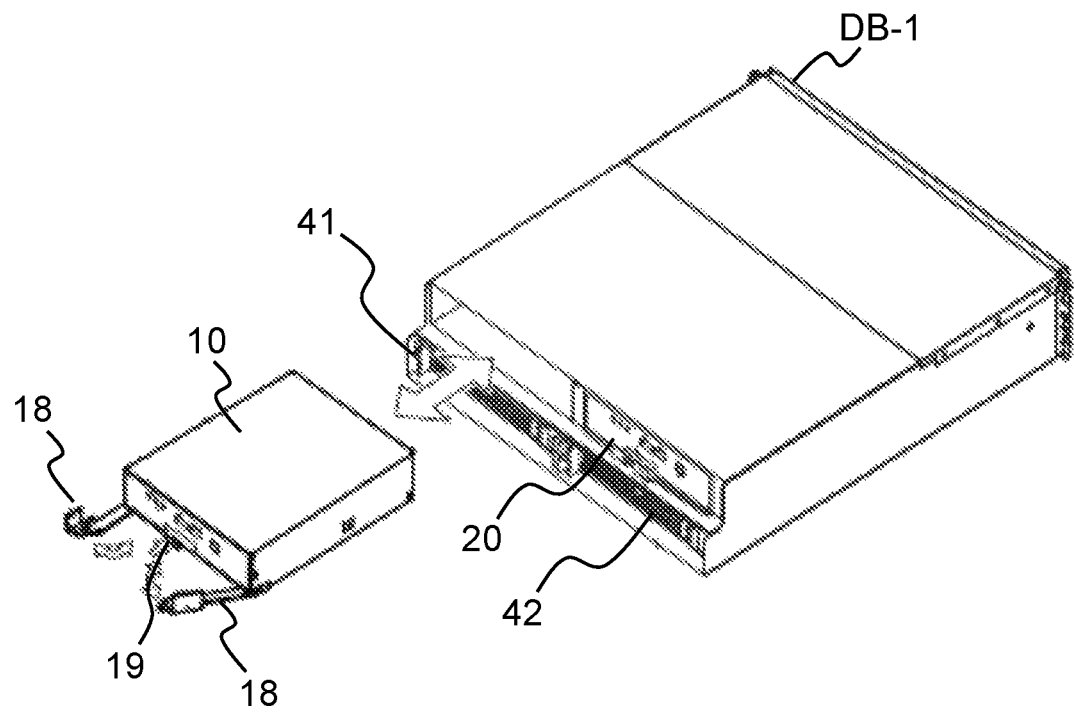

FIG. 2 includes external views of the first drive box DB-1 shown in FIG. 1. The upper view of FIG. 2 is a view when the first drive box DB-1 is viewed obliquely from the front, and the lower view of FIG. 2 is a view when the first drive box DB-1 is viewed obliquely from the rear. The drive group D is stored in the front of the first drive box DB-1. A first canister 10, a second canister 20, a first power source 41, and a second power source 42 are stored in the rear of the first drive box DB-1. The first canister 10 includes a latch 19 and levers 18. An operator releases the latch 19 and then operates the levers 18, and the first canister 10 can be thereby detached easily.

Figure 3:
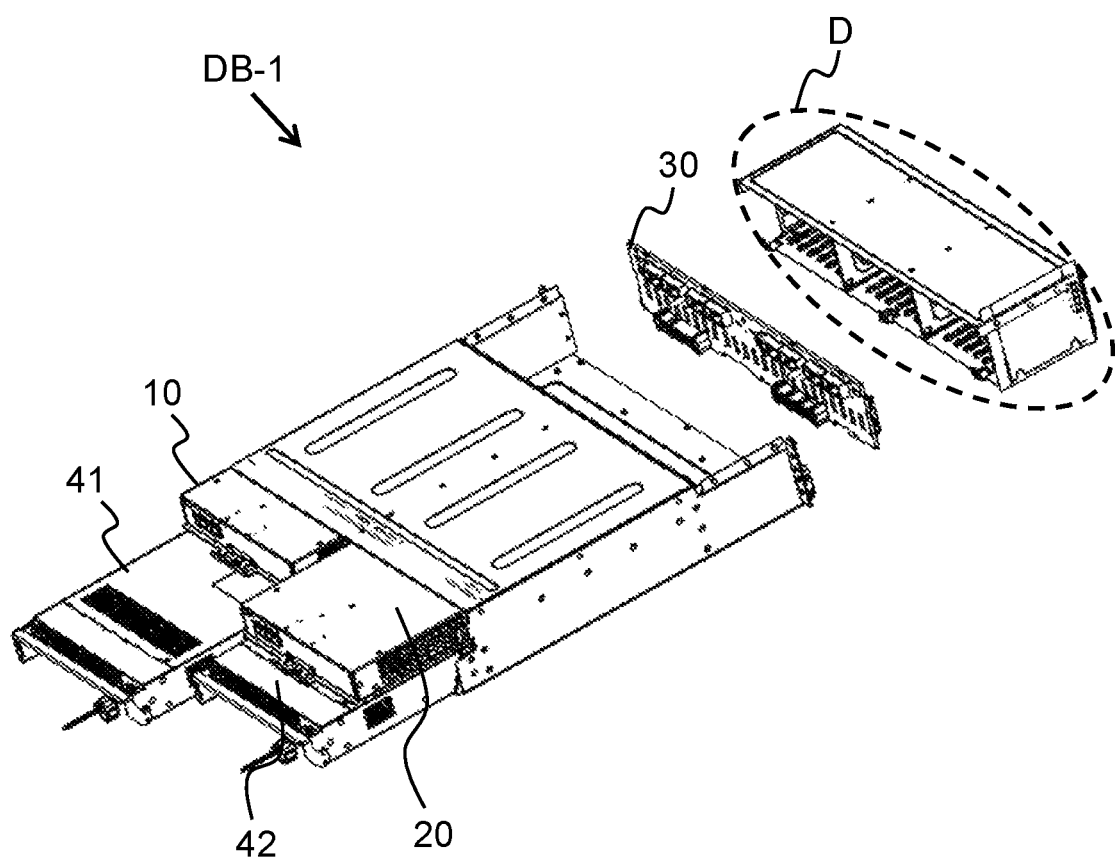
FIG. 3 is an exploded perspective view of the first drive box.

FIG. 3 is an exploded perspective view of the first drive box DB-1. The first drive box DB-1 includes a midplane 30 in addition to the drive group D, the first canister 10, the second canister 20, the first power source 41, and the second power source 42 described above. The midplane 30 couples the drive group D, the first canister 10, the second canister 20, the first power source 41, and the second power source 42 to the midplane 30. The detailed description thereof will be given next in FIG. 4.

Figure 4:
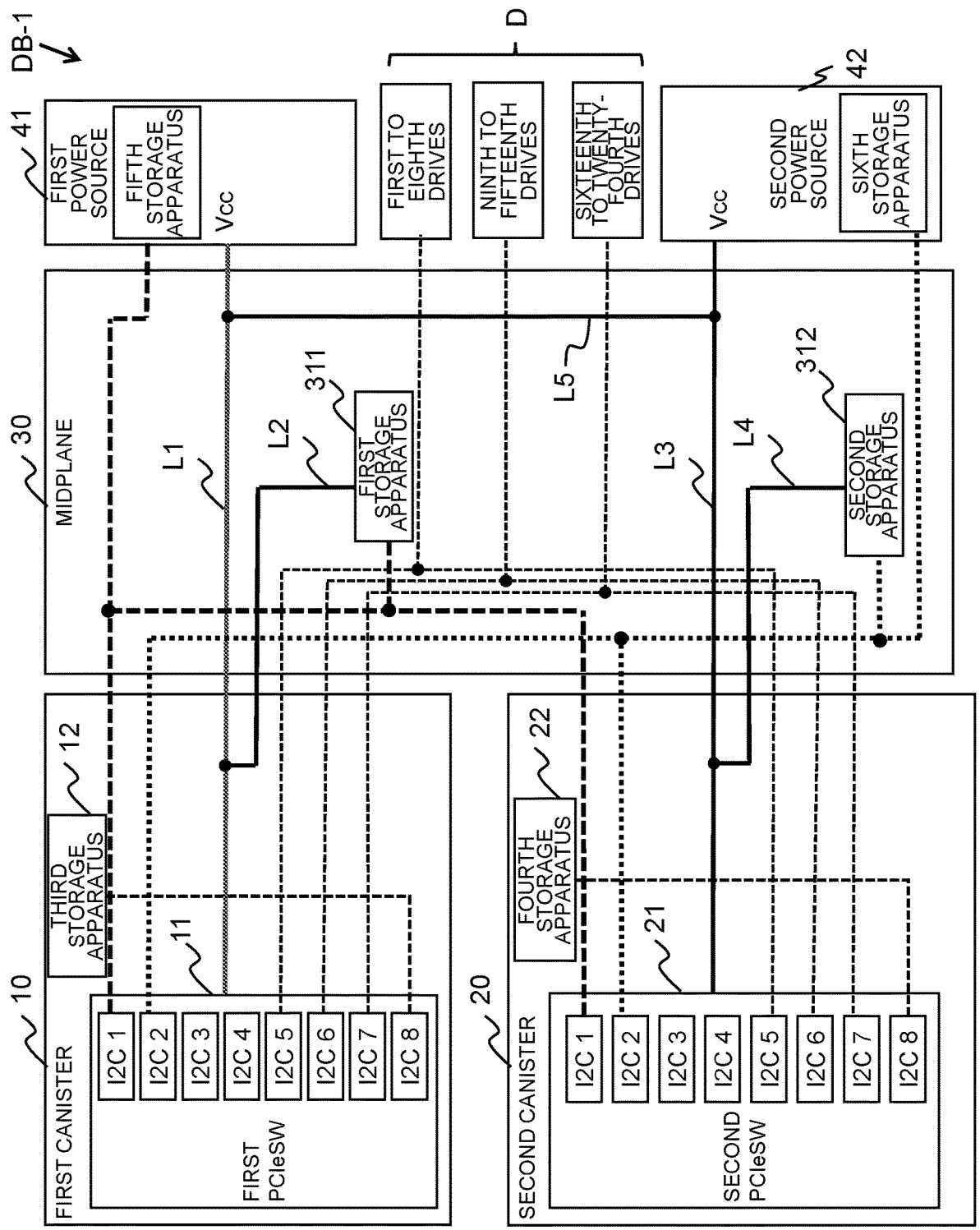
FIG. 4 is a configuration diagram of the first drive box in an embodiment.

FIG. 4 is a configuration diagram of the first drive box DB-1. Note that FIG. 4 does not describe a communication path which is positioned inside the first drive box DB-1 and in which data exchanged between the host 2 and the drive group D flows, in other words, a communication path between each controller and the drive group D in which high-speed large-capacity communication is performed. In FIG. 4, a signal line related to VPD (Vital Product Data) for management is indicated by a broken line, and a power line L which is a power supply line is indicated by a solid line.

The first drive box DB-1 includes the first canister 10, the second canister 20, the midplane 30, the first power source 41, and the second power source 42. The configurations of the first canister 10 and the second canister 20 are identical to each other. The configurations of the first power source 41 and the second power source 42 are identical to each other. The power line L includes a first supply line L1, a first branch line L2, a second supply line L3, a second branch line L4, and a redundant coupling line L5.

Each of the first canister 10 and the second canister 20 performs communication with the storage controller 1 to issue a command to read and write data from and in the drive group D. In addition, each of the first canister 10 and the second canister 20 performs management of operation instructions of the drive group D and two power sources, and information acquisition. The first power source 41 and the second power source 42 supply power to the first canister 10, the second canister 20, the drive group D, and the midplane 30. The midplane 30 provides a connection interface with the drive group D to each of the first canister 10 and the second canister 20. That is, each of the canister and the power source has a redundancy configuration but the midplane 30 does not have the redundancy configuration, and hence, during the operation of the storage system S, it is not possible to power on or off the midplane 30 or replace the midplane 30.

The first canister 10, the second canister 20, the midplane 30, the first power source 41, the second power source 42, and the drive group D have storage apparatuses. In each of the storage apparatuses, the VPD which is important data used for management is stored. Each storage apparatus performs communication by using I2C (Inter-Integrated Circuit) which is a serial communication standard. Information obtained from each storage apparatus is provided to the storage controller 1 via the canister. The canister and the power source are made redundant and two canisters and two power sources are mounted. However, the midplane 30 is not made redundant, and hence two storage apparatuses are mounted on one midplane and the storage apparatus is thereby made redundant. With this, even in the case where one of the storage apparatuses fails, the canister can obtain information from the other storage apparatus.

The first canister 10 includes a first PCIeSW 11 which is a switch adaptable to PCI Express, and a third storage apparatus 12. The first PCIeSW 11 is coupled to the drive group D by a communication channel which is not shown. The first PCIeSW 11 includes a plurality of, e.g., eight I2C communication ports, and reads the VPD from the storage apparatus of each apparatus with I2C communication. Specifically, the first PCIeSW 11 reads the VPD of the first canister 10 from the third storage apparatus 12, reads the VPD of the midplane 30 from a first storage apparatus 311, and reads the VPD of the first power source 41 from a fifth storage apparatus 411. Although details are omitted in FIG. 4, the first PCIeSW 11 reads the VPD also from the individual drives of the drive group D.

The second canister 20 includes a second PCIeSW 21 which is a switch adaptable to the PCI Express, and a fourth storage apparatus 22. The second PCIeSW 21 is coupled to the drive group D by a communication channel which is not shown. The second PCIeSW 21 includes a plurality of, e.g., eight I2C communication ports, and reads the VPD from the storage apparatus of each apparatus with the I2C communication. Specifically, the second PCIeSW 21 reads the VPD of the second canister 20 from the fourth storage apparatus 22, reads the VPD of the midplane 30 from a second storage apparatus 312, and reads the VPD of the second power source 42 from a sixth storage apparatus 421. In addition, although details are omitted in FIG. 4, the second PCIeSW 21 reads the VPD also from the individual drives of the drive group D.

As will be described later, the first PCIeSW 11 performs processing for restoring the I2C communication when a timeout of the I2C communication with the first storage apparatus 311 or the like occurs, and hence the first PCIeSW 11 can be also referred to as "diagnosis apparatus". Further, the first PCIeSW 11 notifies the storage controller 1 of a communication failure with the first storage apparatus 311 or the like, and hence the first PCIeSW 11 can be also referred to as "notification unit". The second PCIeSW 21 performs similar processing, and hence the second PCIeSW 21 can be also referred to as "diagnosis apparatus" or "notification unit".

The midplane 30 includes the first storage apparatus 311 and the second storage apparatus 312 which store information related to the midplane 30. Information related to the midplane 30 is stored in the first storage apparatus 311 and the second storage apparatus 312. Each of the first storage apparatus 311 and the second storage apparatus 312 is a relatively simple device adaptable to I2C which is a communication standard, and does not have a hardware configuration for executing a reset, i.e., a reset switch.

The first supply line L1 is a power line which couples the first power source 41 and the first PCIeSW 11, and passes through the midplane 30. The first branch line L2 is disposed so as to extend over the first canister 10 and the midplane 30. The first branch line L2 branches off from the first supply line L1 in the first canister 10, and is coupled to the first storage apparatus 311 in the midplane 30. The second supply line L3 is a power line which couples the second power source 42 and the second PCIeSW 21, and passes through the midplane 30. The second branch line L4 is disposed so as to extend over the second canister 20 and the midplane 30. The second branch line L4 branches off from the second supply line L3 in the second canister 20, and is coupled to the second storage apparatus 312 in the midplane 30. The redundant coupling line L5 is disposed in the midplane 30 and couples the first supply line L1 and the second supply line L3.

Power supplied by the first power source 41 is supplied to the first PCIeSW 11 via the first supply line L1. The power supplied by the first power source 41 is also supplied to the first storage apparatus 311, but is not supplied directly to the first storage apparatus 311 in the midplane 30 from the first power source 41. That is, the first supply line L1 that reaches the first canister 10 from the first power source 41 via the midplane 30 branches in the first canister 10, and is coupled to the first storage apparatus 311 in the midplane 30 as the first branch line L2. The same applies to a relationship between the second power source 42 and the second storage apparatus 312. Specifically, power supplied by the second power source 42 is supplied to the second canister 20 via the midplane 30, and the power line that branches inside the second canister 20 returns to the midplane 30, and the power is supplied to the second storage apparatus 312. The redundant coupling line L5 is provided for supplying power to the entire first drive box DB-1 even in the case where the operation of one of the first power source 41 and the second power source 42 is stopped.

Effect of Power Line L

A description will be given of effects of the power line L other than the redundant coupling line L5. In the case where the storage controller 1 acquires an operation status of the first drive box DB-1 or the first power source 41 mounted on the first drive box DB-1, for example, the storage controller 1 accesses the first storage apparatus 311 and the fifth storage apparatus from an I2C 1 provided in the first PCIeSW 11 in the first canister 10 to acquire information. The I2C communication is means for performing communication with a relatively simple mechanism, and hence there are cases where communication cannot be performed normally due to a mistake in reception of a signal. In such cases, communication is suspended, and a timeout is detected on the side of the first PCIeSW 11.

When the first PCIeSW 11 detects the timeout, the first PCIeSW 11 performs a soft reset on each device to restore the communication. However, there are cases where the soft reset is not successful. In the case where the soft reset is not successful, i.e., in the case where the communication is not restored even when the soft reset is performed, the first PCIeSW 11 notifies the maintenance PC 3 of the occurrence of a failure via the first controller. The maintenance PC 3 provides a notification to an operator by using the display unit 31. When the operator is notified of the failure of the I2C communication from the first PCIeSW 11, the operator performs insertion and removal of the first canister 10, replacement of the first canister 10, and replacement of the first power source 41.

In the case where the soft reset is not successful, there is a possibility that a signal line is stuck in any of the fifth storage apparatus, the first storage apparatus 311, and the first PCIeSW 11. In such a case, it is possible to perform a hard reset on the first storage apparatus 311 by detaching the first canister 10 temporarily and then coupling the first canister 10 to the midplane 30 again. That is, power supply to the first storage apparatus 311 is stopped by detaching the first canister 10, and the power supply to the first storage apparatus 311 is resumed by attaching the first canister 10 again.

Similarly to this, it is possible to perform the hard reset on the second storage apparatus 312 by detaching and re-attaching the second canister 20. Further, a power supply channel to the first storage apparatus 311 and a power supply channel to the second storage apparatus 312 are independent of each other, and hence, when the hard reset is executed on one of the storage apparatuses, the power supply to the other storage apparatus can be continued. For example, when the I2C communication with the first storage apparatus 311 is stopped, the storage controller 1 can operate the storage system S by using the second storage apparatus 312, and the hard reset can be performed on the first storage apparatus 311 by inserting and removing the first canister 10 while the second storage apparatus 312 is used.

Comparative Example

Figure 5:
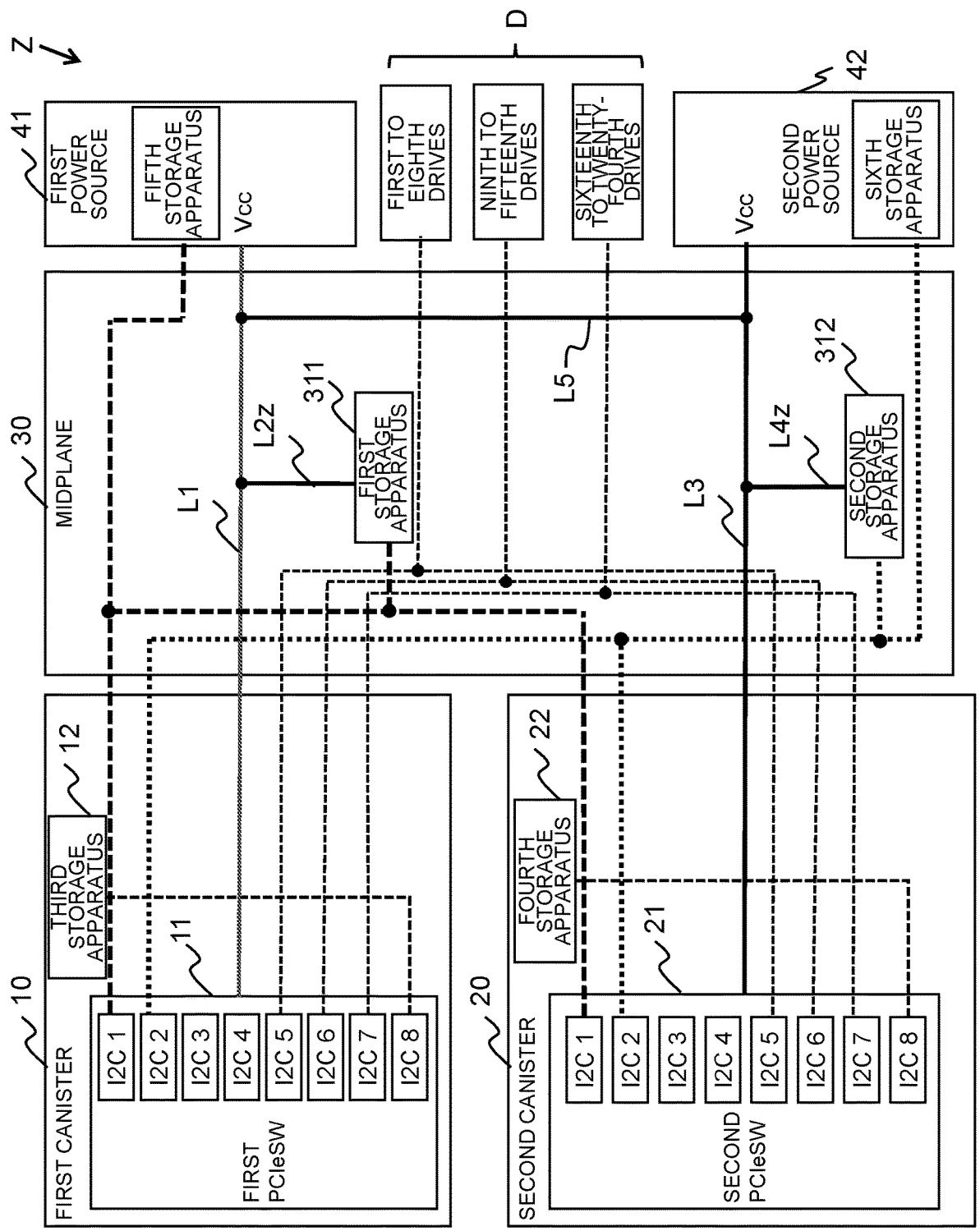
FIG. 5 is a configuration diagram of a comparative example box.

FIG. 5 is a configuration diagram of a comparative example box Z which is a comparative example of the first drive box DB-1. The comparative example box Z is different from the first drive box DB-1 only in the configuration of the power line which supplies power to the first storage apparatus 311 and the second storage apparatus 312. A comparative example power line Lz provided in the comparative example box Z is constituted by the first supply line L1, a comparative first branch line 2z, the second supply line L3, a comparative second branch line L4z, and the redundant coupling line L5. The configurations of the first supply line L1, the second supply line L3, and the redundant coupling line L5 constituting the comparative example power line Lz are identical to those of the lines having the same names of the power line L. The comparative first branch line L2z branches off from the first supply line L1 in the midplane 30 and is coupled to the first storage apparatus 311. The comparative second branch line L4z branches off from the second supply line L3 in the midplane 30 and is coupled to the second storage apparatus 312.

In order to minimize the length of the power line, it is rational to cause the comparative first branch line L2z coupled to the first storage apparatus 311 disposed in the midplane 30 to branch off from the first supply line L1 in the midplane 30. However, in the comparative example box Z, it is not possible to perform the hard reset on the first storage apparatus 311 during the operation of the system. For example, the first canister 10 is not present in the channel of power supply to the first storage apparatus 311, and hence the power supply to the first storage apparatus 311 is continued even when the first canister 10 is detached from the midplane 30. In addition, even when only one of the first power source 41 and the second power source 42 is detached, the power supply is continued by the redundant coupling line L5. That is, in the comparative example box Z, unless power feeding to the entire comparative example box Z is stopped and the operation of the system is interrupted by detaching the first power source 41 and the second power source 42 from the midplane 30, it is not possible to implement the hard reset on the first storage apparatus 311.

Figure 6:
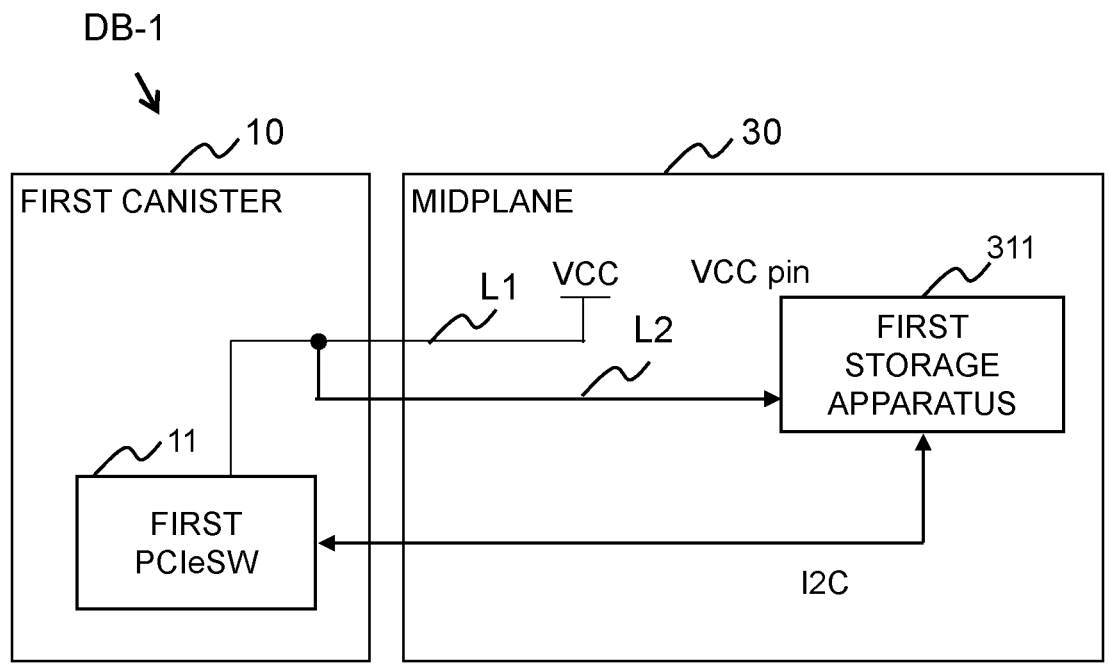
FIG. 6 is a schematic view showing a difference in configuration between the first drive box and a comparative example box Z.
Figure 6:
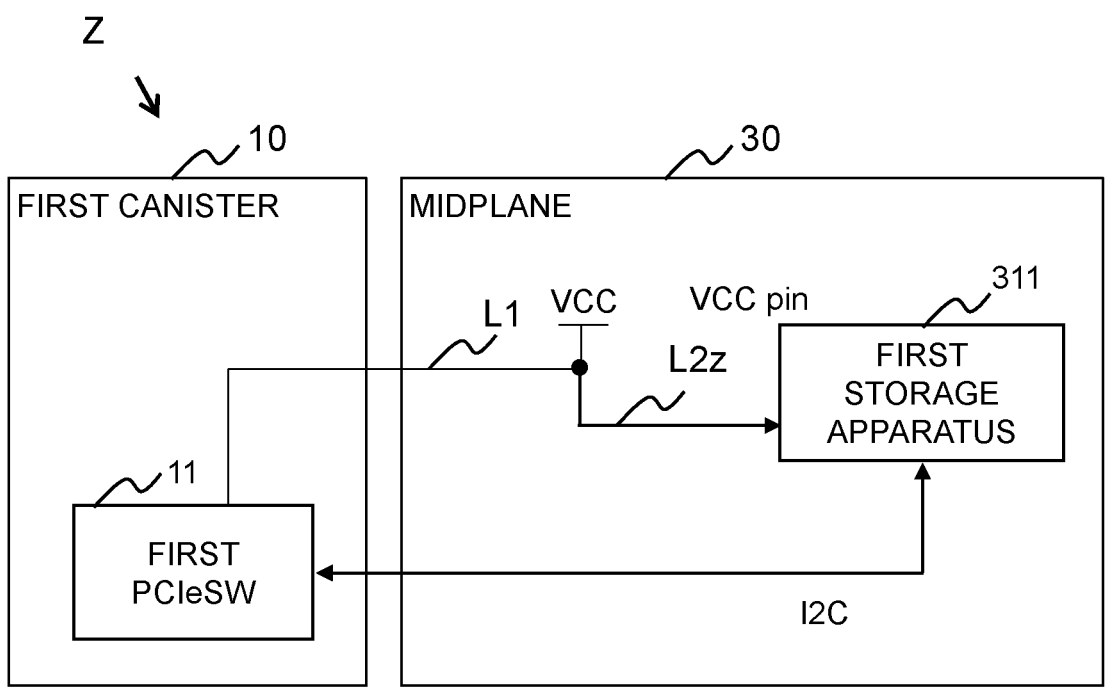

FIG. 6 is a schematic view showing a difference in configuration between the first drive box DB-1 and the comparative example box Z. Main differences between the first drive box DB-1 and the comparative example box Z lie in the second branch line L4 and the comparative second branch line L4z. They are different in the position of branching off from the first supply line L1. The first drive box DB-1 does not need addition of a specific part to the comparative example box Z, and can be implemented easily.

Figure 7:
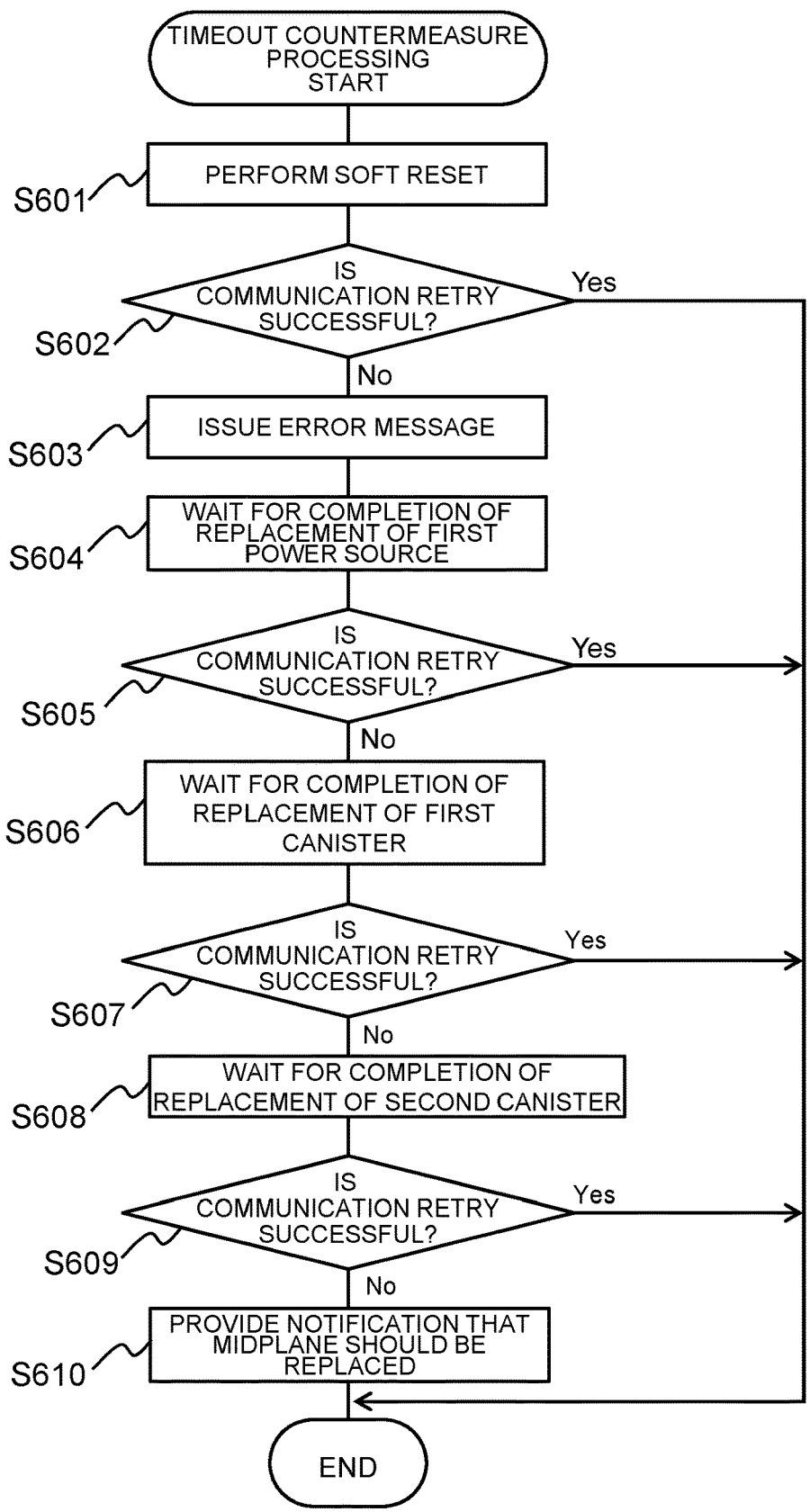
FIG. 7 is a flowchart showing an example of timeout countermeasure processing.

FIG. 7 is a flowchart showing an example of timeout countermeasure processing executed by the first canister 10. As will be described later, when an error message is issued, there are cases where the order of replacement of configurations of the drive box DB-1 is not specified, and hence there are cases where processing order differs every time timeout processing is performed. When the timeout of the I2C communication with the first storage apparatus 311 occurs, the first PCIeSW 11 executes the timeout countermeasure processing shown in FIG. 7. Note that the second canister 20 also executes the same processing when the timeout of the I2C communication with the second storage apparatus 312 occurs.

In the timeout countermeasure processing, first, in Step S601, the first PCIeSW 11 performs the soft reset of the first storage apparatus 311. This soft reset is performed by transmitting a predetermined signal. Subsequently, in Step S602, the first PCIeSW 11 determines whether or not a communication retry is successful. The first PCIeSW 11 proceeds to Step S603 in the case where the first PCIeSW 11 determines that the communication retry is not successful, and the first PCIeSW 11 ends the processing shown in FIG. 7 in the case where the first PCIeSW 11 determines that the communication retry is successful.

In Step S603, the first PCIeSW 11 issues an error message, and reports the occurrence of an error in the I2C communication to the storage controller 1. At this point of time, it is not possible to determine whether a cause of the timeout of the I2C communication lies in the first storage apparatus 311 or the fifth storage apparatus in the power source because the I2C signal line is shared. Note that the storage controller 1 notifies the operator of the reported information in Step S603 via the maintenance PC 3, and the operator replaces the first power source 41. Subsequently, in Step S604, the first PCIeSW 11 waits for the replacement of the first power source 41 by the operator. In Step S604, the first PCIeSW 11 may determine that the first power source 41 has been replaced by waiting for a predetermined time period, and may also determine that the replacement has been performed from data stored in the fifth storage apparatus of the first power source 41.

Subsequently, in Step S605, the first PCIeSW 11 performs communication with the first storage apparatus 311 again to determine whether or not the communication retry is successful. The first PCIeSW 11 proceeds to Step S606 in the case where the first PCIeSW 11 determines that the communication retry is not successful, and the first PCIeSW 11 ends the processing shown in FIG. 7 in the case where the first PCIeSW 11 determines that the communication retry is successful. Subsequently, in Step S606, the first PCIeSW 11 issues the error message again, and waits for the replacement of the first canister 10 by the operator. The fifth storage apparatus has been replaced in Step S604, and hence the first storage apparatus 311, the first PCIeSW 11, and the second PCIeSW 21 remain. When the first canister 10 is detached from the drive box DB-1 for replacement, the first branch line L2 which supplies power to the first storage apparatus 311 is disconnected, and the first storage apparatus 311 is brought into a state in which the power source is separated from the first storage apparatus 311. In addition, the first canister 10 is coupled to the drive box DB-1 again, and the first storage apparatus 311 is thereby powered on again. With this, it is possible to perform the hard reset on the first storage apparatus.

Subsequently, in Step S607, the first PCIeSW 11 determines whether or not the communication retry is successful. The first PCIeSW 11 proceeds to Step S608 in the case where the first PCIeSW 11 determines that the communication retry is not successful, and the first PCIeSW 11 ends the processing shown in FIG. 7 in the case where the first PCIeSW 11 determines that the communication retry is successful. In Step S608, the first PCIeSW 11 issues the error message again, and waits for the replacement of the second canister 20 by the operator. In Step S609, the first PCIeSW 11 determines whether or not the communication retry is successful. The first PCIeSW 11 proceeds to Step S610 in the case where the first PCIeSW 11 determines that the communication retry is not successful, and the first PCIeSW 11 ends the processing shown in FIG. 7 in the case where the first PCIeSW 11 determines that the communication retry is successful.

In Step S610, the first PCIeSW 11 issues the error message, and notifies the storage controller 1 that the midplane 30 should be replaced. When the operator is notified that the midplane 30 should be replaced, the operator replaces the midplane 30 after stopping the first drive box DB-1, and restarts the first drive box DB-1. Note that, in Step S610, the first PCIeSW 11 may stop the first drive box DB-1, i.e., power off the first drive box DB-1.

According to the first embodiment described above, the following operation and effect are obtained.

(1) The drive box DB-1 includes the first power source 41, the drive group D which is constituted by a plurality of storages, the first canister 10 which can be replaced, and the midplane 30 which couples the first canister 10 and the drive group D. The midplane 30 includes the storage apparatus 311 having a memory unit in which data related to at least the drive group D is stored. The first canister 10 has the communication channel which is coupled to at least the storage and the storage apparatus. Power is supplied to the first canister 10 from the first power source 41 by the first supply line L1 which is the power line passing through the midplane 30. Power is supplied to the first storage apparatus 311 from the first power source 41 via the first canister 10. Accordingly, it is possible to implement the hard reset of the first storage apparatus 311 by insertion and removal of the first canister 10. The detail thereof is as follows.

In the case where the timeout of the I2C communication between the first PCIeSW 11 and the first storage apparatus 311 or the fifth storage apparatus occurs, it is conceivable to restore the communication of the I2C bus by replacing a module on the I2C bus or performing the hard reset. However, it is possible to perform, by insertion and removal of another module, the hard reset on the first storage apparatus 311 on which the hard reset cannot be performed due to its structure and which needs to stop the entire drive box DB-1 in order to replace the first storage apparatus 311. With this, it is possible to restore the I2C communication without stopping the system.

(2) Power is supplied to the first storage apparatus 311 from the first power source 41 by the first branch line L2. The first branch line L2 branches off from the first supply line L1 in the first canister 10. Accordingly, it is possible to shorten the first supply line L1.

(3) The drive box DB-1 includes the first PCIeSW 11 which also functions as a notification unit which presents information to the operator. The first canister 10 includes the first PCIeSW 11 that also functions as a diagnosis apparatus which can communicate with the first storage apparatus 311. When the timeout of the communication between the first PCIeSW 11 and the first storage apparatus 311 occurs, the first PCIeSW 11 transmits a soft reset command to the first storage apparatus 311 and, when the timeout of the communication with the first storage apparatus 311 occurs after the transmission of the soft reset command, the first PCIeSW 11 notifies the storage controller 1 of the communication failure with the first storage apparatus 311. In this case, it can be said that the first PCIeSW 11 is a communication apparatus which outputs a command to output an image to the maintenance PC 3.

Modification 1

In the above-described embodiment, the first PCIeSW 11 has tried the soft reset after the occurrence of the communication error. However, the first PCIeSW 11 does not need to try the soft reset. In this case, in the timeout countermeasure processing in FIG. 7, the processing is started from Step S603.
Modification 2

The maintenance PC 3 may include a sound output unit which presents information to the operator by using sound instead of the display unit 31, e.g., a speaker. That is, it is only required that the maintenance PC 3 includes means for notifying the operator of information. In this case, it can be said that the first PCIeSW 11 is a communication apparatus which outputs a command to output sound.
Modification 3

The first drive box DB-1 may include means for notifying the operator of information without using the maintenance PC 3 such as turning on an LED indicative of a replacement portion at the time of occurrence of a failure instead of the display unit 31 of the maintenance PC 3. In this case, it can be said that the first PCIeSW 11 is a communication apparatus which outputs a command to output light.
Modification 4

In the first embodiment described above, the power supply to the first storage apparatus 311 has been performed via the first canister 10. However, the power supply to the first storage apparatus 311 may also be performed via another insertable-removable module (hereinafter referred to as "alternative intervention module") such as the first power source 41. Note that the alternative intervention module needs to satisfy a condition that the alternative intervention module shares the I2C line with the first storage apparatus 311.
Modification 5

Figure 8:
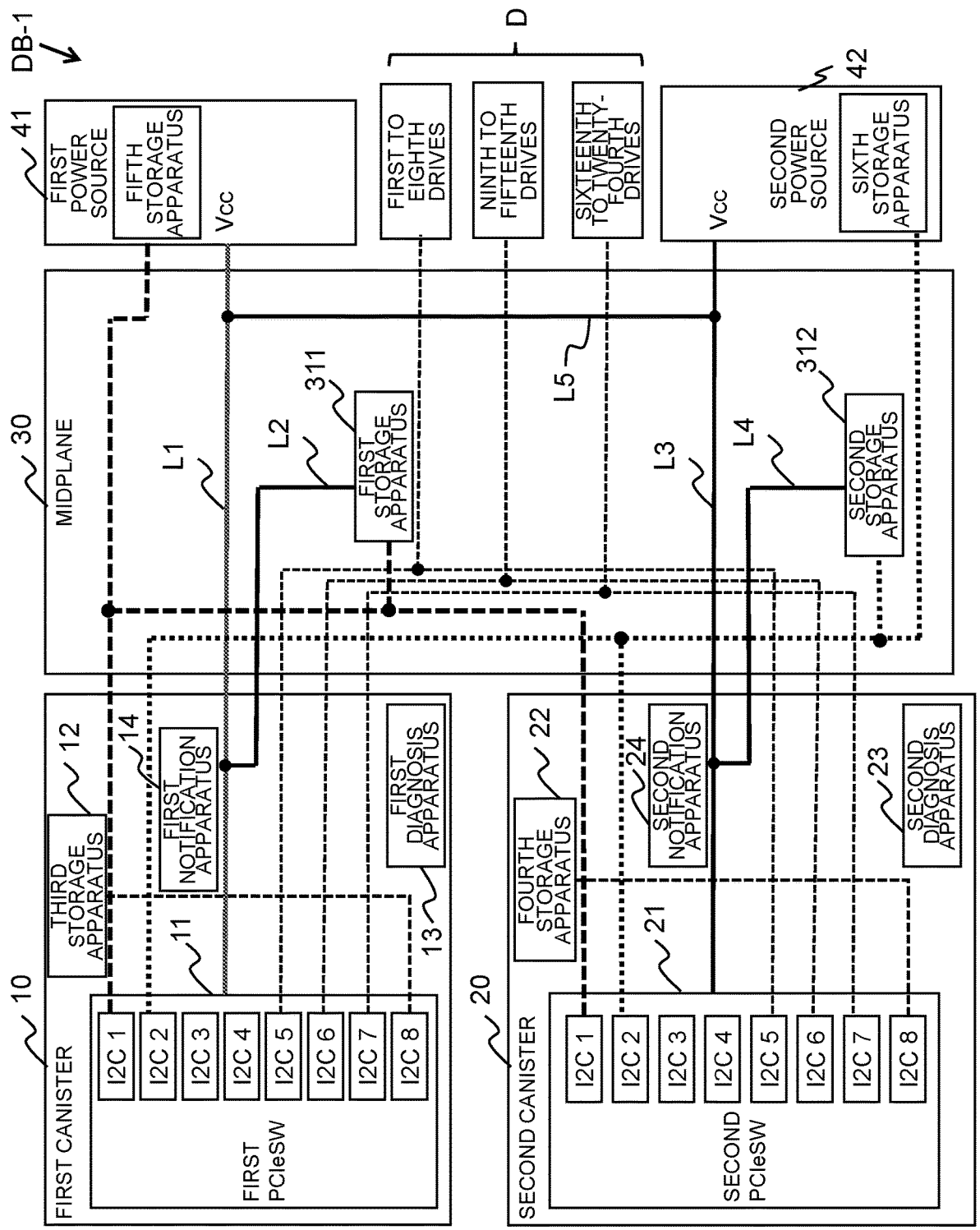
FIG. 8 is a configuration diagram of the first drive box in Modification 5.

FIG. 8 is a configuration diagram of the first drive box DB-1 in Modification 5. The first drive box DB-1 shown in FIG. 8 further includes a first diagnosis apparatus 13, a first notification apparatus 14, a second diagnosis apparatus 23, and a second notification apparatus 24 which implement functions performed by the first PCIeSW 11 and the second PCIeSW 21 in the above-described embodiment. Each of the first diagnosis apparatus 13, the first notification apparatus 14, the second diagnosis apparatus 23, and the second notification apparatus 24 can be implemented by a microcomputer or the like.
Modification 6

Figure 9:
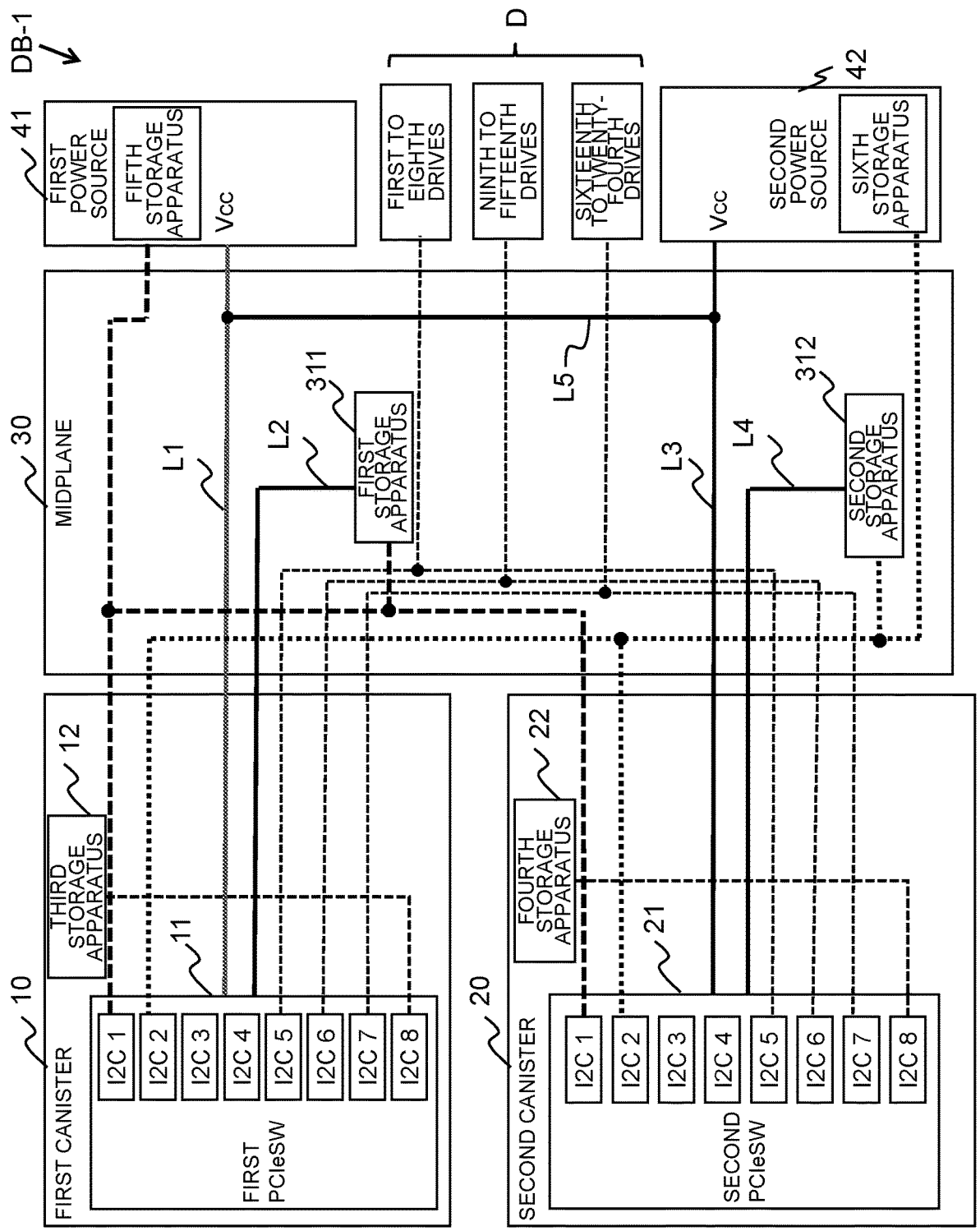
FIG. 9 is a configuration diagram of the first drive box in Modification 6.

FIG. 9 is a configuration diagram of the first drive box DB-1 in Modification 6. The first drive box DB-1 shown in FIG. 9 is different from that in FIG. 4 in the configurations of the first branch line L2 and the second branch line L4. Specifically, the first branch line L2 couples the first PCIeSW 11 and the first storage apparatus 311, and the second branch line L4 couples the second PCIeSW 21 and the second storage apparatus 312. In this case, in the first PCIeSW 11 and the second PCIeSW 21, it is possible to supply voltage after being decreased or increased to the first storage apparatus 311 and the second storage apparatus 312.

According to Modification 6 described above, the following operation and effect are obtained.

(4) The first supply line L1 is coupled to a power-supplied object of the first canister 10, i.e., the first PCIeSW 11. Power is supplied to the first storage apparatus 311 from the first PCIeSW 11. Accordingly, it is possible to convert voltage in the power-supplied object, i.e., increase or decrease voltage and then supply power to the first storage apparatus 311.

In each of the embodiment and the modifications described above, the configuration of functional blocks is only an example. Several functional configurations shown as separate functional blocks may be configured integrally, or the configuration shown in one functional block diagram may be divided into two or more functions. In addition, a configuration may also be adopted in which part of functions of each functional block is provided in another functional block.

The embodiment and the modifications described above may also be combined. In the above description, while various embodiments and modifications have been described, the present invention is not limited to the contents thereof. Other embodiments considered within the scope of the technical idea of the present invention are also included in the scope of the present invention.

In each of the embodiment and the modifications described above, the storage apparatuses mounted on the midplane are made redundant and have two independent channels as the communication channels with the first canister and the second canister and, even in the case where an abnormality of one part or one communication channel occurs, operation as the system is allowed with the other storage apparatus.

What is claimed is:

1. A drive box comprising:
   a power source;
   a drive group which is constituted of a plurality of storages;
   a canister which is configured to be replaced; and
   a midplane which couples the canister and the drive group, wherein
   the midplane includes a storage apparatus having a memory unit in which data related to at least the drive group is stored,
   the canister has a communication channel which is coupled to at least one of the plurality of storages,
   the canister performs I2C communication with the storage apparatus,
   power is supplied to the canister from the power source by a first supply line which is a power line passing through the midplane, and
   power is supplied to the storage apparatus from the power source via the canister.

2. The drive box according to claim 1, wherein
   power is supplied to the storage apparatus from the power source by a first branch line, and
   the first branch line branches off from the first supply line in the canister.

3. The drive box according to claim 1, wherein
   the first supply line is coupled to a power-supplied object of the canister, and
   power is supplied to the storage apparatus from the power-supplied object.

4. The drive box according to claim 1, further comprising a notification unit which presents information to an operator, wherein
   the canister includes a diagnosis apparatus which is configured to communicate with the storage apparatus, and
   the diagnosis apparatus transmits a soft reset command to the storage apparatus when a timeout of communication between an apparatus mounted on the canister and the storage apparatus occurs, and provides notification of a failure of communication with the storage apparatus by using the notification unit when a timeout of the communication with the storage apparatus occurs after the transmission of the soft reset command.

5. The drive box according to claim 4, wherein the notification unit is a communication apparatus which outputs a command to output any of sound, an image, and light.

\* \* \* \* \*